Nov. 12, 1946.　　　T. A. RICH　　　2,411,055
MAGNETIC CLUTCH
Filed July 11, 1945　　　2 Sheets-Sheet 1

Inventor:
Theodore A. Rich,
by Prowell F. Mack
His Attorney.

Nov. 12, 1946.  T. A. RICH  2,411,055
MAGNETIC CLUTCH
Filed July 11, 1945  2 Sheets-Sheet 2
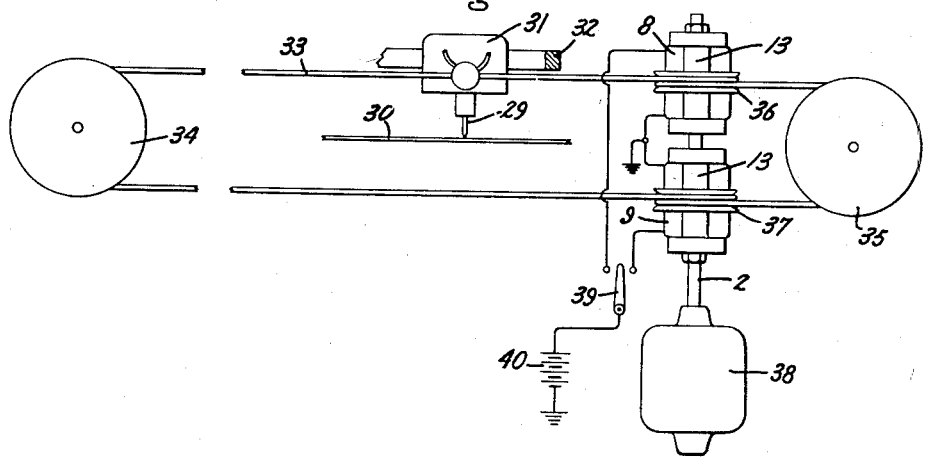
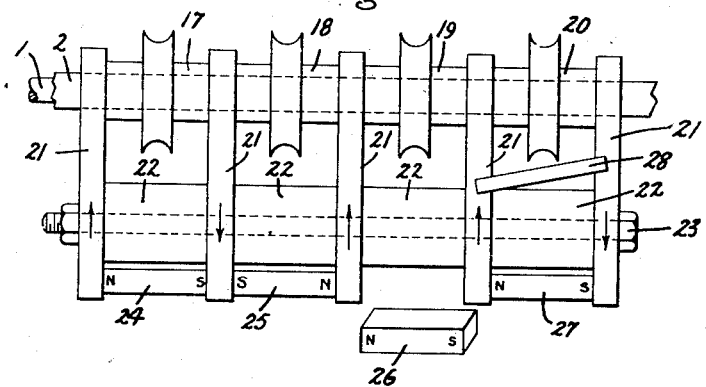
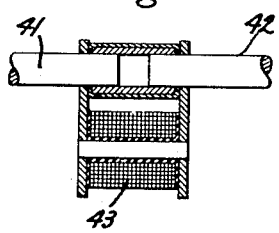
Inventor:
Theodore A. Rich,
by Prawell Mack
His Attorney.

Patented Nov. 12, 1946

2,411,055

UNITED STATES PATENT OFFICE 2,411,055

MAGNETIC CLUTCH

Theodore A. Rich, Schenectady, N. Y., assignor to General Electric Company, a corporation of New York Application July 11, 1945, Serial No. 604,399

6 Claims. (Cl. 192—84)

My invention relates to magnetic clutches and its object is to provide a small magnetic clutch capable of carrying high torque and requiring a small amount of magnetic energy for its operation. My clutch is well adapted for use with measuring and control devices.

Figure 1:
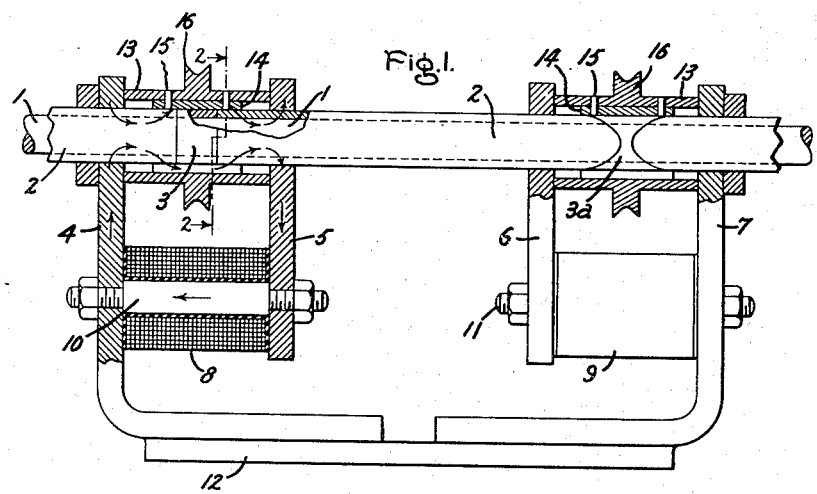
Figure 2:
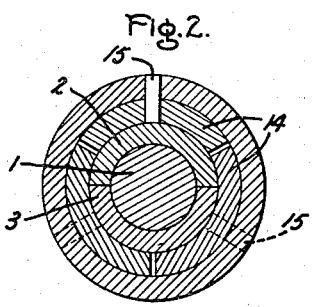
Figure 3:
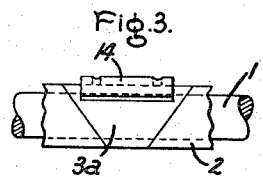

The features of my invention which are believed to be novel and patentable will be pointed out in the claims appended hereto. For a better understanding of my invention, reference is made in the following description to the accompanying drawings in which Fig. 1 is a partially sectioned side view of a pair of magnetic clutches embodying my invention wherein stationary flux carrying members for the clutches serve as bearing pedestals for the shaft on which the clutches are used. Fig. 2 is a cross-sectional view of one of the clutches of Fig. 1 taken on line 2—2, Fig. 1. Fig. 3 is a side view and Fig. 4 a top view of a portion of the clutch which will be referred to in explaining a structure designed to eliminate residual magnetism in the clutch when deenergized. Fig. 5 shows the application of a pair of my clutches for operating a stylus back and forth across a recording chart; Fig. 6 represents a permanent magnet clutch energizing arrangement, and Fig. 7 represents the use of my clutch as a variable torque coupling between two shafts.

Referring to Figs. 1 and 2, I have represented a shaft which for the convenience of my invention may be formed of an inner section 1 and a concentric outer section 2 over the length or lengths of shaft occupied by my clutch or clutches. The outer section contains a section 3 or 3a made of brass or other nonmagnetic material as is also inner section 1, while section 2 is of magnetic material. The shape of the brass sections 3 and 3a in the two clutches of Fig. 1 differs for purposes to be explained. The shaft is mounted for rotation in suitable bearings and as represented in Fig. 1, members 4, 5, 6, and 7 which are used as pole pieces to convey flux to my magnetic clutches are employed as bearing pedestals. Two clutches are represented in Fig. 1, one clutch lying between members 4 and 5 and the other between members 6 and 7. It is to be noted that outer nonmagnetic sections 3 and 3a completely encircle the shafts between the flux pole pieces 4 and 5 and between flux pole pieces 6 and 7. Hence, there is the equivalent of an air gap along the shaft between the pole pieces, if only the shaft structure is considered. In Fig. 1 coils 8 and 9 on magnetic core bolts 10 and 11 between the pole pieces 4 and 5 and between pole pieces 6 and 7 produce the magnetomotive forces or fluxes for the corresponding pole pieces. The connection 12 between pole piece portions 4 and 7 is merely to provide a convenient base and is not included in any flux path, and should preferably be made of nonmagnetic material.

Between the pole pieces of the clutches and on the shaft are nonmagnetic sleeves 13 concentrically spaced from the shaft by sector-shaped bearing plates 14 of magnetic steel. In the clutches represented there are three sector-shaped bearing plates 14 each extending about the shaft slightly less than 120 degrees and of a length sufficient to span the nonmagnetic shaft section 3 and also 3a, except at its longest portion.

The bearing plates 14 are preferably made of hardened steel so as to have good wearing qualities and have a bearing fit with respect to the shaft. These three bearing plates per clutch may be made by slitting a steel sleeve, which has been fitted to the shaft with bearing clearance, into three equal sectors. Thus there is a very slight clearance between their inner peripheries and the shaft surface, so that these bearing plates may move radially inwardly very slightly tight against the shaft to clutching engagement therewith. These bearing or clutch plates may be held in place in sleeve 13 by a pair of dowel pins 15 per plate secured in sleeve 13 and extending inwardly into openings in the plates with liberal clearance, such that the plates are free to move radially a slight amount and to adjust themselves to a bearing fit on the shaft. Preferably, the pin 15 holding arrangement is such that these plates do not drop out of place in case the sleeve 13 is removed from the shaft. Thus the openings in plates 14 and the pins 15 may have a slight taper. The outer surface of the sleeves 13 are provided with a driving surface, such as a flat belt surface, a gear, a grooved pulley, a flywheel, etc., depending upon the purpose for which used. In the illustration a grooved pulley 16 is represented.

The operation of my magnetic clutch may be explained as follows: Considering first the clutch shown at the left in Fig. 1 having the shaft gap section 3; when the coil 8 is deenergized, the assembled parts 13, 14, 15, 16 are free to rotate on the shaft as an idler pulley with a good bearing fit. When coil 8 is energized, preferably with direct current, a flux circulates through the magnetic circuit as follows: from core 10 through pole piece 4, through adjacent magnetic shaft section 2 out into the three steel bearing and clutch plates of the pulley, which bridge across the nonmagnetic shaft section 3, then inwardly into shaft section 2 which is adjacent pole piece 5 through which the flux then returns to core 10. Such flux path is generally indicated by arrows in Fig. 1. When this flux flows, the clutch plates 14 are drawn inwardly tight against the shaft by magnetic attraction, changing the bearing surface between the plates 14 and shaft into a drive fit through which a surprising amount of torque may be conveyed without slippage. The amount of torque which can thus be conveyed through the clutch is adjustable within limits by controlling the energizing current of coil 8 and the amount of flux produced. If the shaft is rotating and the pulley stationary, and the clutch is then energized, the pulley will immediately start to rotate with the shaft and when the clutch is deenergized, the pulley will immediately stop if there is any load on it to bring it to a stop.

Figure 4:
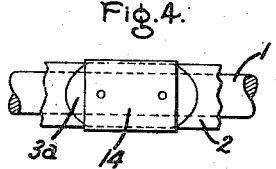

It has been found that where hardened steel plates are used at 14 so as to provide the best bearing wearing surfaces, these plates tend to retain residual magnetism after the clutch has been deenergized; and that this residual magnetism flows in the path above described and produces noticeable drag between the pulley and shaft. Where this is objectionable it can be substantially eliminated by the use of a nonmagnetic shaft section as at 3a in the clutch at the right in Fig. 1, shaped to open the flux path of individual clutch plates 14 when there is relative rotation between the shaft and pulley. Portions of this form of clutch are shown in Figs. 3 and 4. The nonmagnetic shaft section 3a is made wedge-shaped as best shown in the side view thereof in Fig. 3, with the longest part of section 3a uppermost. When one of the sector-shaped steel plates 14 is centered on this longest portion of the section 3a as shown in Figs. 3 and 4, it is completely out of contact with the magnetic portions 2 of the shaft so that the residual flux path thereof is open, and as each of the three plates 14 rotates over this point of sector 3a, any residual flux retained thereby is effectively knocked down to a negligible value. On the other hand, when the clutch is energized, at least two of the plates 14 are in bridging relation over the narrow portion of section 3a at all times, so that good clutching action is obtained. However, even the plate 14 positioned as shown in Figs. 3 and 4 will have some clutching action when the clutch is energized even though it is less than that of the other two plates. Moreover, such other two plates will have an increased flux and have a correspondingly increased clutching action so that there is little loss in the clutch torque when energized by reason of this residual flux knockdown expedient. Other shapes or axial formations for section 3a could be used to obtain this knockdown result. The shape shown for 3a is represented because it is easily and inexpensive to make mechanically. The adjacent surfaces of sections 2 will of course conform to the shape of section 3 or 3a so as to make a complete bearing surface for the plates 14 when the clutch is deenergized.

Two or more clutches may be grouped together so as to be energized in series relation either by a coil or by a permanent magnet. In Fig. 6, I have represented by way of example one of a variety of arrangements of grouped clutches. Assume that 17, 18, 19, and 20 are magnet clutch pulley arrangements similar to those previously described having pole piece bearing pedestals 21 as represented. Nonmagnetic blocks 22 and a nonmagnetic bolt 23 are provided to space and support the assembled pole pieces 21 as indicated. The clutch energizing force is produced by using permanent magnets 24 to 27, inclusive, between the pole pieces. As represented, clutches 17, 18, and 20 are energized and clutch 19 deenergized. Where two or more adjacent clutches are energized, as 17 and 18, it is relatively immaterial whether they be energized in series or individually. As represented, they are energized individually by their separate magnets. However, if the magnet 25 be turned end for end, both magnets 24 and 25 would be in series relation and likewise the flux through the clutches 17 and 18 with the intermediate pole piece between clutches 17 and 18 carrying little or no flux.

If the magnet 25 be turned end for end and magnet 26 be inserted to magnetize clutch 19 with its north pole to the left, all four clutches would energized in series and become equivalent to a single clutch having four clutching units.

In such series arrangement the clutching power may be reduced by substituting a block of soft iron in place of one or more of the magnets. It is not necessary to have mechanical contact between the magnets 24, 25, 26, 27 and pole pieces 21 and these magnets may be moved by appropriate mechanism to control the rotation of the various clutches.

The clutching energy for clutch 20, Fig. 6, may be altered somewhat by variations in placing the magnet 27 or by the use of a shunt such as indicated at 28 across the pole pieces. Likewise the clutching power of any clutch may be increased up to the point where saturation becomes a limiting factor by using two or more permanent magnets in parallel across the same set of pole pieces.

These and other modifications of my invention will occur to those skilled in the art.

In Fig. 5 I have represented the use of my invention to the operation of a recording stylus 29 back and forth across a recording chart 30. The recording stylus carriage 31 slides on a square guide rod 32 and is connected to a cord belt 33 which runs over idler pulleys 34 and 35 and drive pulleys 36 and 37. The drive pulleys 36 and 37 are integral with a pair of my nagnetic clutches designated by reference character 13, the shaft portion 2 of which is continuously driven in a given direction by a motor 38. It is to be noted that the cord 33 is wrapped once around the drive pulleys 36 and 37 in such directions that for the same direction of rotation of the drive pulleys, carriage 31 will be moved in one direction when one clutch is energized and in the opposite direction when the other clutch is energized. The clutch energizing coils indicated at 8 and 9 are connected to be energized through a double throw switch 39 from a source of supply 40. Only one of the clutches can be energized at a time and hence the stylus can be moved back and forth across the chart and stopped in any desired position by manipulation of switch 39 which is represented in the open position. Such reversing action may be combined with any desired form of measuring or control system, but it is not the purpose of this application to elaborate on this.

Fig. 7 shows a simple form of my magnetic transmission. The drive shaft 41 can rotate at any desired speed but the torque transmitted to the driven shaft 42 may be controlled by the current through the coil 43.

In accordance with the provisions of the Patent Statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. A magnetic clutch comprising two magnetic shaft sections rotatively supported in axial alignment and magnetically spaced apart, a plurality of magnetic plates of sector-shaped cross section grouped about said shaft sections in axially overlapping relation therewith and providing a magnetic connection between said shaft sections, the inner surfaces of said plates having a bearing fit on said shaft sections, means for supporting said plates as thus grouped while permitting limited free radial movement of the plates toward and away from the shaft sections, and means for producing at will a flux from one magnetic shaft section to the other through said plates to thereby cause the plates to clutch the shaft sections with a force proportional to such flux.

2. A magnetic clutch comprising two magnetic shaft sections of the same diameter and arranged for rotation in axial alignment with a magnetic gap between them, a plurality of magnetic plates of sector-shaped cross section grouped about, extending between, and axially overlapping the aligned ends of said magnetic shaft sections, the inner surfaces of said plates having bearing fits on said shaft sections, a nonmagnetic housing in which said plates are supported as thus grouped, said housing permitting limited radial movement of the plates relative to the shaft sections, a stationary magnetic bearing housing for each of said shaft sections for making magnetic connections to said shaft sections on either side of and spaced from said plates, and means for producing at will a flux between said bearing housings so as to cause flux to flow into one shaft section through the magnetic plates to the other shaft section thereby causing the plates to clutch the shaft sections.

3. A magnetic clutch wheel and shaft arrangement comprising a magnetic shaft having a nonmagnetic shaft section, a wheel on said shaft extending over the nonmagnetic shaft section, said wheel having a nonmagnetic hub spaced from said shaft and a shorter magnetic bearing lining having a bearing fit on said shaft and overlapping the nonmagnetic section thereof so as to form a magnetic bridge between the magnetic shaft sections, said magnetic bearing lining being divided into peripheral spaced apart sectors each of which can move radially in the housing from an outer position corresponding to the bearing fit relation with the shaft to an inner position where it tightly clutches the shaft, magnetic bearing pedestals for said shaft on either side of said wheel and with which the ends of the hub of said wheel lightly engage to position the wheel along the shaft, and means for producing a variable magnetomotive force between said bearing pedestals to produce a flux through the magnetic portions of said shaft and wheel lining between the pedestals to cause the wheel to be clutched to the shaft with a force proportional to such flux.

4. A magnetic clutch pulley and shaft arrangement comprising a rotary shaft made up of magnetic sections separated by a nonmagnetic section, a pulley mounted for rotation on and extending over the nonmagnetic section of said shaft, said pulley having an inner bearing lining fitted on said shaft made of magnetic material and subdivided into axially extending sections which are sufficiently freely radially movable in the hub of the wheel as to allow radial movement of the sections from outer positions corresponding to a good bearing fit on the shaft to inner positions where the bearing lining clutches the shaft, said magnetic bearing lining extending over the nonmagnetic portion of the shaft onto the magnetic portions, and stationary means for, at will, producing a magnetic flux along said shaft which passes through said magnetic bearing lining causing it to clutch the shaft and causing the wheel and shaft to rotate together.

5. A magnetic clutch wheel and shaft arrangement comprising a rotary shaft composed of two magnetic sections spaced apart by a nonmagnetic section, a wheel on said shaft having a magnetic lining with a bearing fit on said shaft and magnetically bridging over the nonmagnetic section thereof, said lining being formed of sector-shaped parts in driving relation with the wheel but radially movable in the wheel hub between outer positions corresponding to a good bearing fit on the shaft to inner positions where they clutch the shaft, stationary means for, at will, producing a flux along said shaft which passes through the magnetic bearing lining and causes the lining to clutch the shaft, the axial formation of the nonmagnetic shaft section being such that when there is relative rotation between the shaft and wheel the individual magnetic bearing parts consecutively occupy a position where the magnetic circuit through such part between the spaced magnetic shaft sections is broken.

6. A magnetic clutch wheel and shaft arrangement comprising a rotary shaft having two magnetic sections separated by a nonmagnetic section, a wheel on said shaft extending over the nonmagnetic section thereof, said wheel having a nonmagnetic hub and a shorter magnetic lining within the hub having a bearing fit on the shaft, said lining being formed of three similar sector-shaped parts spaced apart about the shaft, said parts being secured in the wheel hub for slight radial movement between limits corresponding to a freely rotating bearing fit on the shaft to a firm clutching engagement with the shaft, stationary magnetic bearing pedestals for said shaft on either side of the nonmagnetic shaft section, said pedestals also serving to position the wheel along the shaft by reason of contact with the nonmagnetic hub portion thereof, means for, at will, producing a magnetomotive force between said bearing pedestals, resulting in a flow of flux along said shaft which causes the magnetic bearing lining to clutch the shaft and establish a torque transferring driving connection between the shaft and wheel, said nonmagnetic shaft section having an axial length which varies about the shaft such that when a magnetic bearing sector is positioned on the longer part the flux path along the shaft and through such bearing sector is opened, while the flux paths through the other two magnetic bearing sectors and magnetic shaft sections are closed, such arrangement causing residual flux in the bearing sectors to be knocked down when the clutch is demagnetized and relative rotation occurs between the wheel and shaft.

THEODORE A. RICH.